United States Patent
Rzepkowski et al.

(10) Patent No.: US 6,614,456 B1
(45) Date of Patent: *Sep. 2, 2003

(54) SYSTEMS, METHODS AND GRAPHICAL USER INTERFACES FOR CONTROLLING TONE REPRODUCTION CURVES OF IMAGE CAPTURE AND FORMING DEVICES

(75) Inventors: Kristinn R. Rzepkowski, Rochester, NY (US); Rudolph A. Rodrigues, Rochester, NY (US)

(73) Assignee: Xerox Corporation, Stamford, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,271

(22) Filed: Jan. 19, 2000

(51) Int. Cl.⁷ .............................. G06F 3/00; G06F 3/14
(52) U.S. Cl. ...................... 345/833; 345/771; 345/773; 345/786
(58) Field of Search ................................ 345/764, 771, 345/773, 784, 786, 787, 810, 833, 835, 840, 846

(56) References Cited

U.S. PATENT DOCUMENTS

| | | | | |
|---|---|---|---|---|
| 5,412,773 A | * | 5/1995 | Carlucci et al. | 345/810 X |
| 5,615,347 A | * | 3/1997 | Davis et al. | 345/833 |
| 5,640,595 A | * | 6/1997 | Baugher et al. | 710/10 |
| 5,659,790 A | * | 8/1997 | Kim et al. | 707/500.1 |
| 5,751,285 A | * | 5/1998 | Kashiwagi et al. | 345/833 |
| 5,920,317 A | * | 7/1999 | McDonald | 345/835 X |
| 6,215,487 B1 | * | 4/2001 | Barrett et al. | 345/840 |
| 6,333,752 B1 | * | 12/2001 | Hasegawa et al. | 345/764 |

* cited by examiner

*Primary Examiner*—John Cabeca
*Assistant Examiner*—X. L. Bautista
(74) *Attorney, Agent, or Firm*—Oliff & Berridge, PLC

(57) ABSTRACT

One image forming/capture device feature is the ability to finely control image quality response curves. To enable fine control, the user defines a number of points to which the response curve is to be fit. The response curve is fit to or through these points. However, users have trouble appreciating the effects of this adjusted response curve in converting input image values to output image values. The response curve control graphical user interface allows the user to finely control a response curve of an image quality for an image forming/capture device in an intuitive manner, by providing a plurality of slider portions that allow the user to more intuitively control the image quality response curve. These slider portions mimic control elements of conventional photocopier control panels. Each slider corresponds to a point, or a range of points, of the response curve. The slider portions are arranged so that the points associated with each slider portion are arranged in an easily understandable order. Each slider portion indicates, for the associated point, or range of points, of the input image, the image value of the output image for that point, or for that range of points. The appearance of a portion of each of the slider portions is altered based on the selected image value of the output image for the point, or the range of points, of the input image. Thus, the user can intuitively appreciate the effects of adjustments made to the response curve.

24 Claims, 11 Drawing Sheets

SYSTEMS, METHODS AND GRAPHICAL USER INTERFACES FOR CONTROLLING TONE REPRODUCTION CURVES OF IMAGE CAPTURE AND FORMING DEVICES

BACKGROUND OF THE INVENTION

1. Field of Invention

This invention is directed to a graphical user interface for an image capture device or an image forming device.

2. Description of Related Art

Scanners and other types of image capture devices, and digital copiers and other image forming devices, have become ubiquitous office productivity tools for generating electronic images of physical original documents or generating physical copies of electronic images. Once an electronic image has been generated, either from scratch or from a physical original document, the electronic image data can be used in an infinite variety of ways to increase the productivity and the product quality of an office. Such image capture devices include desktop scanners, other stand alone scanners, digital still cameras, digital video cameras, the scanning input portions of digital copiers, facsimile machines and other multi-function devices that are capable of generating electronic image data from an original document, and the like. These image capture devices can also include image databases that store previously captured electronic image data. Such image forming devices include digital copiers, laser printers, ink jet printers, color ink jet printers, and the like.

However, as the costs of these various image capture devices and image forming device have dropped and the output quality of the physical copies and the captured electronic image data has improved, these image capture devices and image forming devices have been provided with an ever increasing number of controllable features. Similarly, as users have become comfortable with capturing and using electronic image data obtained from original documents to create physical copies, the uses to which the electronic image data has been put, and thus the needed control over the quality and appearance of the electronic image data and the physical copies, have expanded greatly.

In response, standard interfaces between such image capture devices, including those indicated above, and the various application programs that use such captured electronic image data has been developed. These standard interfaces allow standard compliant image capture devices and standard compliant applications to easily communicate. One exemplary embodiment of such a standard interface is the TWAIN™ interface. The TWAIN™ interface allows any TWAIN™ compliant application program to input and use electronic image data using any TWAIN™ compliant image capture device.

SUMMARY OF THE INVENTION

The TWAIN™-compliant component protocol facilitates communication between application programs and image capture devices, such as those indicated above. One such TWAIN™ image capture device is the XEROX® DigiPath™ scanner.

The ever-increasing numbers of features provided by image forming devices and image capturing devices, such as the Xerox® DigiPath™ scanner, cause users of these image forming devices and image capturing devices to find it increasingly difficult to obtain the desired image forming or image capturing results.

In particular, one such feature provided by image forming devices and image capturing devices is the ability to finely control various image quality response curves. One such response curve is the tone reproduction curve (TRC). In particular, in some image forming devices and image capture devices, it is possible to finely control the tone reproduction curve beyond merely providing the conventional lower-resolution indication that the entire output image should be lighter or darker than the entire input image.

Accordingly, to enable this fine control, the user is often provided with a graphical user interface, such as that shown in FIG. 5, that allows the user to define a number of points to which a response curve is to be fit. Once the various points are defined, a response curve is fit to or through these points. However, even sophisticated users have trouble intuitively appreciating the effects of this adjusted response curve in converting the input image values to the output image values. Thus, it is often difficult for even sophisticated users to use the graphical user interface shown in FIG. 5 to obtain the desired output image.

This invention thus provides systems, methods and graphical user interfaces that allow the user to finely control a response curve of an image quality for an image forming or capture device in a more intuitive manner.

This invention separately provides systems, methods and graphical user interfaces that provide a plurality of slider portions that allow the user to more intuitively control the image quality response curve.

This invention separately provides systems and methods and graphical user interfaces that include slider portions that mimic control elements of conventional control panels.

This invention separately provides systems, methods and graphical user interfaces that provide control elements for controlling portions of an image quality response curve that each closely mimic the conventional lightness/darkness controls of a photocopier.

In various exemplary embodiments of the systems, methods and graphical user interfaces according to this invention, an image quality response curve control graphical user interface includes a plurality of slider portions. Each slider corresponds to a point, or a range of points, of the image quality response curve. The slider portions are arranged so that the points, or range of points, associated with each slider portion are themselves arranged in an easily understandable order. Each slider portion indicates, for the associated point, or range of points, of the input image the image value of the output image for that point, or for that range of points.

In various exemplary embodiments, the appearance of a portion of each of the slider portions is altered based on the selected image value of the output image for the point, or the range of points, of the input image. Thus, the user can intuitively appreciate the effects of adjustments made to the image quality response curve, such as a tone reproduction curve.

These and other features and advantages of this invention are described in or are apparent from the following detailed description of various embodiments of the systems, methods and graphical user interfaces according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

The following detailed description of the exemplary embodiments in FIGS. 1–5 is particularly directed to an image capture device that generates electronic image data from the image carried on an original document. Thus, the following detailed description of various exemplary embodiments of systems, methods and graphical user interfaces according to this invention will make specific reference to controlling a tone reproduction curve of an image capture device and capturing an electronic image from the original document.

However, as is known to those of ordinary skill in the art, tone reproduction curves are not only used when capturing electronic images of images carried on original documents. Rather, tone reproduction curves are also often used when electronic image data is output to an image forming device, such as a digital copier, a laser printer, an ink jet printer, a facsimile machine, a multi-function device, or any other known or later developed device that generates an image on an image recording medium. Similarly, many other types of image quality response curves beyond a tone reproduction curve can be finely controlled using the image quality response curve control graphical user interface according to this invention.

Thus, while the following detailed description of various exemplary embodiments of the systems, methods and graphical user interfaces of this invention may refer to tone reproduction curves used when capturing electronic image from an original document, it should be appreciated that any of the systems, methods and graphical user interfaces disclosed herein are equally applicable to forming images on an image recording medium using an image forming device and other types of image quality response curves.

Figure 1:
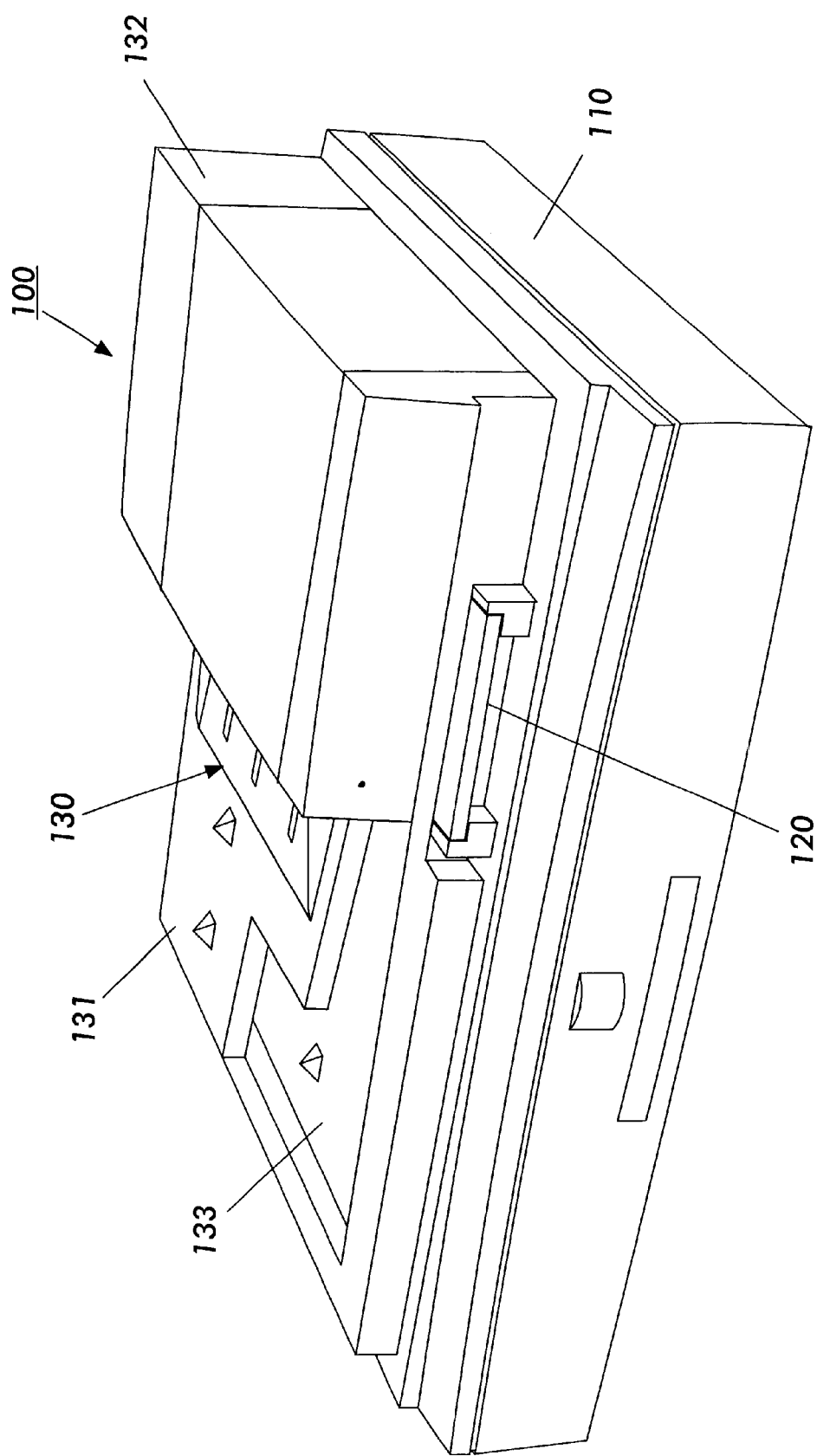
FIG. 1 is a perspective drawing of an exemplary electronic image generating device.

FIG. 1 illustrates a first exemplary embodiment of an electronic image data capturing device 100 usable with the image previewing systems, methods and graphical user interfaces of this invention. As shown in FIG. 1, the electronic image data capture device 100 includes a control panel 110, a document platen 120 on which an original document can be placed to generate corresponding electronic image data and a document handler 130. In particular, the document handler 130 includes a feed tray 131 on which the original document can be placed and a document feeder 132 which moves each document in turn from the feed tray 131 and feeds the removed document to the document platen 120. Each document is then returned to an output tray 133 after electronic image data is generated from that original document.

It should be appreciated that the electronic image data capture device can also be referred to as variously, a scanner, an image capture device, an electronic image data generating device, or the like, and, regardless of the name, can be any one of a stand-alone scanner, a digital copier, a facsimile machine, a multi-function device, a digital still camera, a digital video camera, an electronic image database storing previously generated electronic image data, or any other known or later device that is capable of generating (or supplying) electronic image data from an original document.

Figure 2:
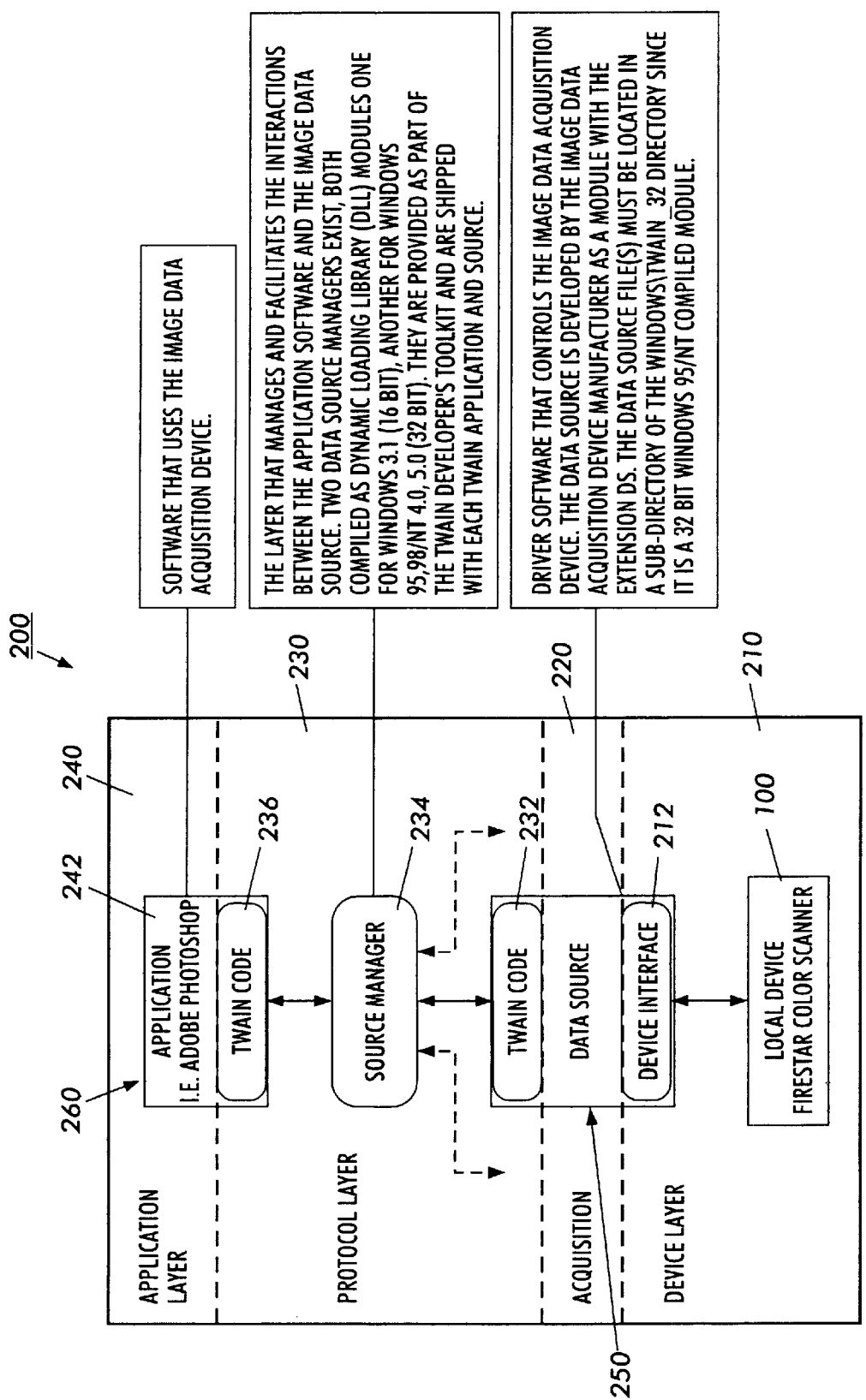
FIG. 2 is a block diagram illustrating a first exemplary embodiment of the structure of an image capture device control system that incorporates the various exemplary embodiments of the image previewing systems, methods and graphical user interfaces of this invention.

FIG. 2 is a block diagram illustrating a first exemplary embodiment of the structural organization of an image capture device control system 200 that incorporates the image previewing systems, methods and graphical user interfaces according to this invention. As shown in FIG. 2, the image capture device control system 200 includes a device layer 210, an acquisition layer 220, a protocol layer 230, and an application layer 240. In particular, the device layer 210 includes the image capture device 100, such as a Xerox® DigiPath™ color scanner or any of the other electronic image data capture devices indicated above. The device layer 210 also includes a device interface portion 212 of a TWAIN™ driver, or TWAIN™ data source, 250. In particular, as shown in FIG. 2, the TWAIN™ driver (or data source) 250 bridges the device layer 210, the acquisition layer 220 and the protocol layer 230.

The protocol layer 230 includes a TWAIN™ code portion 232 of the TWAIN™ driver (or data source) 250, a source manager 234 and a TWAIN™ code portion 236 of a TWAIN™-compliant application 260. The application layer 240 includes the application portion 242 of the application 260.

As shown in FIG. 2, control and data signals are provided from the electronic image data capture device 100 to the TWAIN™ driver (or data source) 250 through the device interface portion 212 of the TWAIN™ driver (or data source) 250. Similarly, control and data signals between the TWAIN™ driver (or data source) 250 and the source manager through the TWAIN™ code portion 232 of the TWAIN™ driver (or data source) 250. The control and/or data signals are also provided between the source manager 234 and the application 260 through the TWAIN™ code portion 236. In various exemplary embodiments, the TWAIN™ driver (or data source) 250 controls the electronic image data capture device 100. In various ones of these exemplary embodiments, the TWAIN™ driver or data source 250 is developed by the manufacturer of the electronic image data capture device 100.

The source manager 234 manages and facilitates the interactions between the application 260 and the TWAIN™ driver or data source 250. In various exemplary embodiments, one or more of two distinct source managers 234 have been implemented. Both are compiled as dynamic loading library modules. One exemplary dynamic load library implementation of the source manager 234 is a 16-bit program developed for, for example, Microsoft® Windows® 3.1. The other dynamic load library implementation of the source manager 234 is a 32-bit program developed for Windows® 95/98 and Windows® NT 4.0/5.0. In general, these two dynamic load library modules are provided as part of the TWAIN™ developers tool kit and are shipped with each TWAIN™-compliant application and at each TWAIN™-compliant electronic image data generating device.

Figure 3:
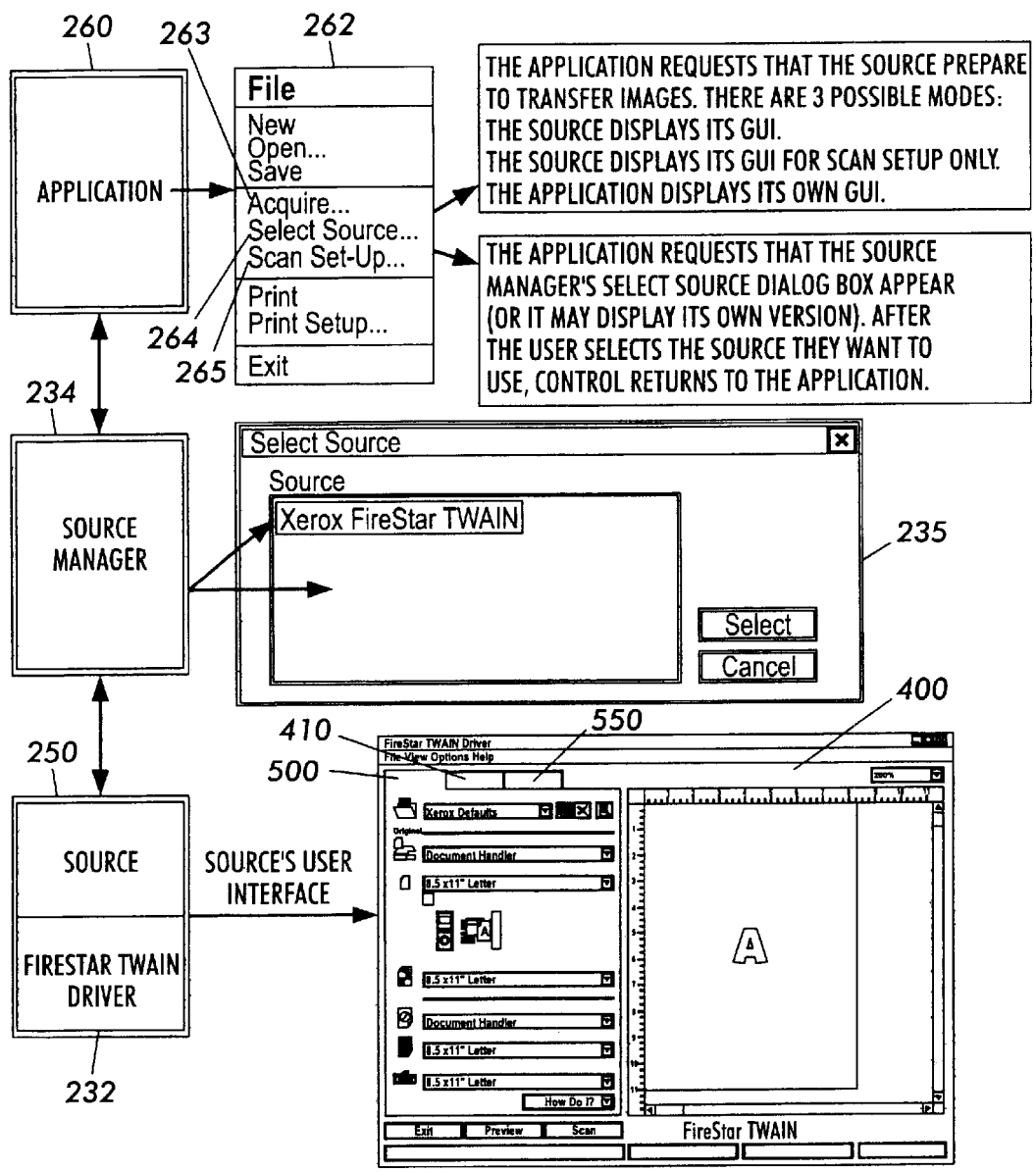
FIG. 3 is a second exemplary embodiment of an image capture and usage system that incorporates the systems and methods of this invention.

FIG. 3 illustrates one exemplary embodiment for accessing the systems, methods and graphical user interfaces according to this invention. As shown in FIG. 3, a FILE menu 262 of a TWAIN™ compliant application 260 will include a plurality of menu items that provide an interface to a TWAIN™ compliant electronic image data capture device 100, such as a TWAIN™-compliant scanner. These menu items include various ones of at least an Acquire menu item 263, a Select Source menu item 264 or a Scan Set-Up menu item 265.

As shown in FIG. 3, selecting the Acquire menu item 263 causes the application 260 to request that the electronic image data capture device 100 prepare to capture electronic image data from an original document and/or transfer capture electronic image data to the image capture device control system. In particular, in response to the selecting the Acquire menu item 263, the application 260 can display its own graphical user interface. Alternatively, the TWAIN™ driver (or data source) 250 for the selected electronic image data capture device can display one of its graphical user interfaces. Finally, if the Scan Set up menu item 265 was selected, the TWAIN™ driver (or data source) 250 can display a specific Scanner Set-Up graphical user interface.

In particular, as shown in FIG. 3, when any of the menu items 263-265 are selected, the application 260 calls the source manager 234. In response, the source manager accesses each TWAIN™ driver (or data source) 250 that is present in the image capture device control system 200. The source manager 234 then displays, in a graphical user interface 235, all of the different TWAIN™ drivers (or data sources) 250 present on the image capture device control system 200. Once the user selects the particular TWAIN™ driver (or data source) 250 that the user wishes to use, the TWAIN™ driver (or data source) 250 will display a graphical user interface 400 that allows the user to select various ones of the image capture parameters and scanning control functions implemented in that TWAIN™ driver (or data source) 250.

Figure 4:
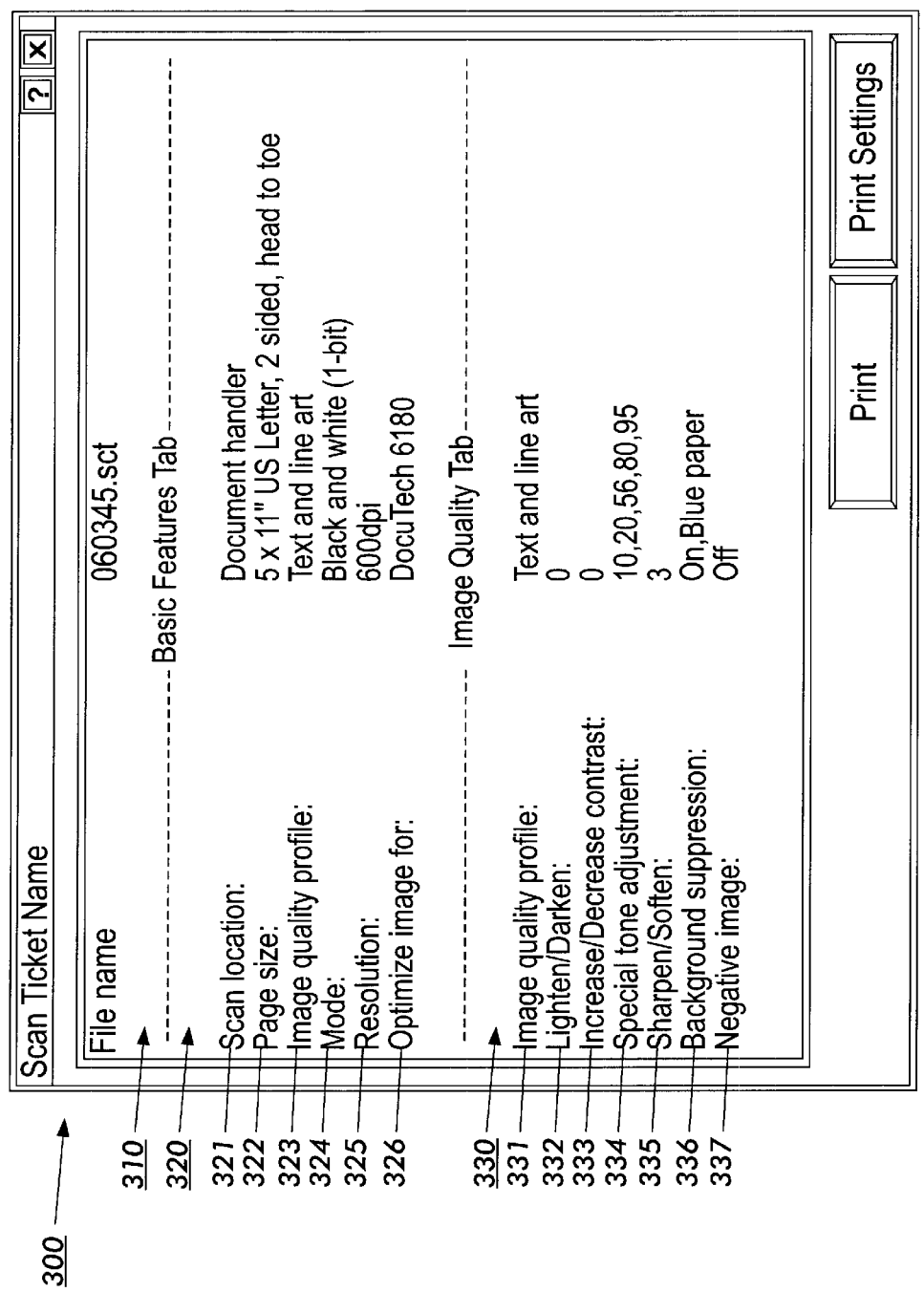
FIG. 4 is an exemplary embodiment of a scan ticket illustrating various image scanning parameters according to this invention.

FIG. 4 illustrates one exemplary embodiment of a scan ticket 300. Scan tickets contain all of the settings in the TWAIN™ graphical user interface 400, which is discussed in greater detail below. In general, there will be a set of one or more sets of saved scan parameters, or "scan tickets" for each language supported the TWAIN™ driver (or data source) 250 according to this invention. When the TWAIN™ graphical user interface 400 is displayed, only those sets of saved scan parameters, or "scan tickets" for the language the user is currently operating in are displayed. When a set of saved scan parameters, i.e., a "scan ticket", is selected, all the settings contained within that scan ticket are used to populate the TWAIN™ graphical user interface 400 according to this invention.

As shown in FIG. 4, a scan ticket 300 includes at least a file name portion 310, a basic features portion 320, an image quality portion 330 and an image size portion (not shown).

The basic features portion 320 corresponds to the basic features tab 500 of the TWAIN™ graphical user interface 400 shown in FIG. 3. Similarly, the image quality portion 330 and the image size portion correspond to the image quality tab 450 and the image size tab 550, respectively, of the graphical user interface 400 shown in FIG. 3. The image quality tab 450 is described in greater detail in below.

As shown in FIG. 4, the basic features portion 320 includes a scan location parameter 321, an input original document size parameter 322, an original image quality profile parameter 323, a mode parameter 324, a resolution parameter 325, and image optimization parameter 326. The image quality portion 330 includes an image quality profile parameter 331, a brightness parameter 332, an increase/decrease parameter 333, a special tone adjustments parameter 334, a sharpen/soften parameter 335, a background suppression parameter 336 and a negative image parameter 337.

In particular, the scan location parameter 321 indicates the particular electronic image capture device that is to be used to capture electronic image data from a particular original document. The page size parameter portion 322 indicates the size of the input document, whether the input document is single-sided or double-sided, and, if the original document is double-sided, how the two images on each side of the original document are oriented relative to each other. The image quality profile portion 323 indicates image characteristics of and enhancements to be applied to the original document when it is made into its electronic form. Image quality profiles are it described in greater detail in U.S. patent application Ser. No. 09/487,269 filed on Jan. 19, 2000 and incorporated herein by reference in its entirety. The mode portion 324 indicates the particular image capture mode to be used. For example, the image of the original document could be captured as a binary bitmap image, as shown in FIG. 4 or, as an 8-bit grayscale image, or as a color image having various color spaces and bit depths.

The resolution portion 325 indicates the resolution of the generated electronic image data. The image optimization portion 326 indicates a particular output device, such as a particular laser printer, a particular ink jet printer, a particular digital copier, or the like, that will be used to generate hard copies of the generated electronic image data and thus for which the electronic image data should be optimized for when the electronic image data of the original document is captured.

The image quality profile parameter 331 of the image quality portion 330 is the same as the image quality profile parameter 323. The lighten/darken parameter 332 indicates whether the electronic image data is to be lighter or darker than the images on the original document. Similarly, the increase/decrease contrast parameter portion 333 indicates whether the contrast of the electronic image data is to be greater or less than the contrast of the images on the original document. The special tone adjustment parameter portion 334 is used to provide finer control over the tone reproduction curve that is used to convert the continuous tone image values of the original document to the multi-bit-depth image values of the generated electronic image data. This is described in greater detail below.

The sharpen/soften parameter portion 335 used to indicate whether the edges within the images in the original document should be sharpened or softened in the generated electronic image data. The background suppression parameter portion 336 is used to indicate whether background suppression should be used, and if so, the color or other quality of the background of the original document that is to be suppressed. The negative image parameter portion 337 indicates whether the generated electronic image data should be a negative image relative to the images on the original document. Various other ones of the particular scanning parameters discussed above are further disclosed in U.S. patent application Ser. Nos.09/487,273, 09/487,274, 09/487,272 and 09/487,266, each filed on Jan. 19, 2000, and each incorporated herein by reference in its entirety.

Figure 5:
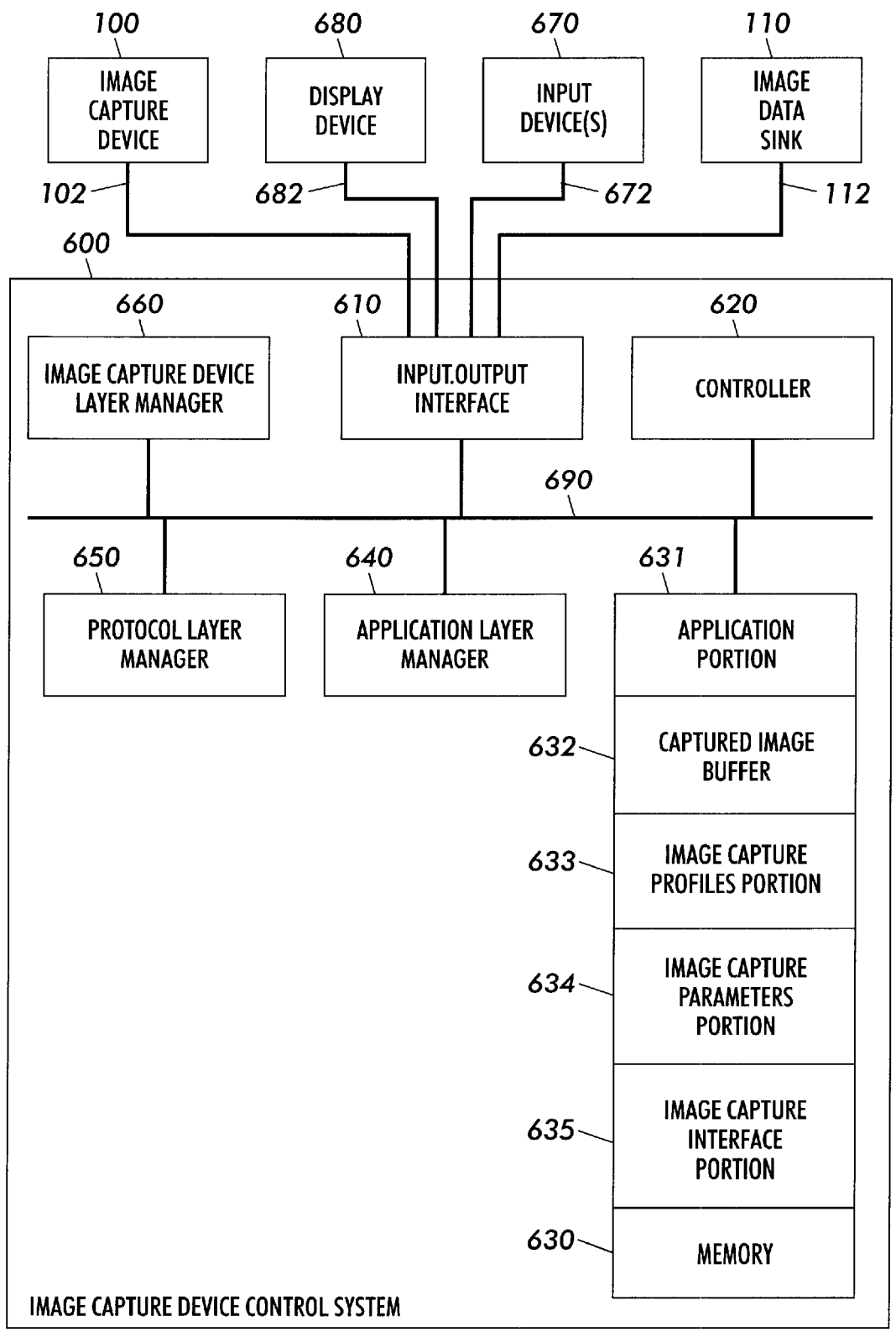
FIG. 5 is a block diagram of a second exemplary embodiment of the image capture control system that incorporates the image previewing systems, methods and graphical user interfaces of this invention.

FIG. 5 is a block diagram illustrating a second exemplary embodiment of the structural organization of an image captured device control system 600 that incorporates the image previewing systems methods and graphical user interfaces according to this invention. As shown in FIG. 5, the image capture device control system 600 includes an input/output interface 610, a controller 620, a memory 630, am application layer manager 640, a protocol layer manager 650, and an image capture device layer manager 660, each interconnected by a data/control bus 690.

The image capture device 100 is connected to the input/output interface 610 using a link 102. Similarly, an image data sink 110 can be connected to the input/output interface 610 using a link 112. The links 102 and 112 can each be any known or later developed device or system for connecting the image capture device 100 and the image data sink 110, respectively, to the image capture device control 600, including a direct cable connection, a connection over a wide area network or a local area network, a connection over an intranet, a connection over an extranet, a connection over the Internet, or a connection over any other distributed processing network or system. In general, the links 102 and 112 can each be any known or later developed connection system or structure usable to respectively connect the image capture device 100 and the image data sink 110 to the image capture device control system 600. It should also be appreciated that the links 102 and 112 can be wired or wireless links that use portions of the public switch telephone network and/or portions of a cellular communication network.

It should also be appreciated that, in general, the image data sink 110 can be any device that is capable of outputting or storing electronic images generated using the image capture device control system 600 using the systems, methods and graphical user interfaces according to this invention, such as a printer, a copier, any other image forming device, a facsimile device, a display device, a storage device, or the like.

While FIG. 5 shows the image capture device 100, the image capture device control system 600 and the image data sink 110 as separate devices, the image capture device control system 600 may be integrated with either or both of the image capture device 100 and/or the image data sink 110, such as, for example, in a digital copier. With such a configuration, for example, the image capture device 100, the image data sink 110 and the image capture device control system 600 may be contained within a single device.

The input device or devices 670 can include any one or more of a mouse, a keyboard, a touch pad, a track ball, a touch screen, or the like, or any other known or later developed device that is capable of inputting data and control signals over the link 672 to the input/output interface 610. Similarly, the display device 680 can be any known or later developed display device, including a cathode ray tube type monitor, a flat screen type monitor, an LCD monitor, or any other known or later developed device on which the graphical user interfaces according to this invention can be displayed and interacted with using one or more of the input devices 670. The display device 680 is provided with control and/or data signals from the input/output interface 610 over the link 682.

Like the signal lines 102 and 112, the links 672 and 682 can be any known or later developed device or system for connecting the input devices 670 and the display device 680, respectively, to the image capture device control system 600, including a direct cable connection, a connection over a wide area network or local area network, a connection over a intranet, a connection over an extranet, a connection over the Internet, a connection over the public switched telephone network, a connection over a cellular network, or a connection over any other distributed processing or communications network or system, including both or either wired and wireless systems. In general, the links 672 and 682 can each be any known or later developed connection system or structure usable to connect the input devices 670 and the display device 680, respectively, to the image capture device control system 600.

The memory 630 includes an application portion 631 in which an application program and any application files used by that application program can be stored. Similarly, the captured image buffer 632 is used to store the captured image data input from the image capture device 110 over the signal line 102 and through the input/output interface 610. In general, the captured electronic image data will be stored in the captured image buffer 632 under control of the controller 620 the image capture device layer manager 660, the protocol layer manager 650 and/or the application layer manager 640.

The image capture profiles portion 633 stores the image capture profiles, as set forth in the incorporated 269 application, as well as job tickets 300, and the like. The image capture parameters portion 634 stores a current set of the image capture parameters to be used by the image capture device 100 when capturing an image. The image capture interface portion 635 stores the various graphical user interfaces shown in FIGS. 3, 4, and 6 and as described above and in detailed below.

The application layer manager 640 manages the application layer 240, and in particular, the application portions 242 of any executing applications 260.

The protocol layer manager 650 manages the protocol layer 230, including the source manager 234. The protocol layer manager 650 communicates with the application layer manager 640 using the TWAIN™ application programming interfaces 236 of the executing applications 260.

The image capture device layer manager 660 manages each of the TWAIN™ drivers (or data sources) 250 that may be implemented for different ones of the image capture devices 100 that may be accessible by the image capture device control system 600 over various ones of the links 102. In particular, the image capture device layer manager 660 communicates with the protocol layer manager 650 using the acquisition layer application programming interface 232 of the particular TWAIN™ driver (or data source) 250. Similarly, the image capture device layer manager 660 communications with the image capture device 100 through the input/output interface 610 and over the link 102 using the device interface portion 212.

The image capture device layer manager 660 causes various ones of the image capture graphical user interfaces, such as the graphical user interface 400 shown in FIG. 3, to be displayed on the display device 680. The user can then change and/or input the various image capture parameters. The various image capture parameters can be input through the various graphical user interfaces that the image capture device layer manager 660 displays on the display device 680. Then, after the user saves the various image capture parameters or initiates the corresponding image capture device, the image capture device layer manager 660 stores the selected image capture parameters in the image capture parameters portion 640. The image capture device layer manager 660 then outputs the selected image capture parameters through the input/output interface 610 and over the link 102 to the image capture device 100. The image capture device 100 then uses the various image capture parameters received from the image capture device control system 600 when capturing electronic image data from an original document and when supplying that capture electronic image data over the link 110 to the image capture device control system 600.

Figure 6:
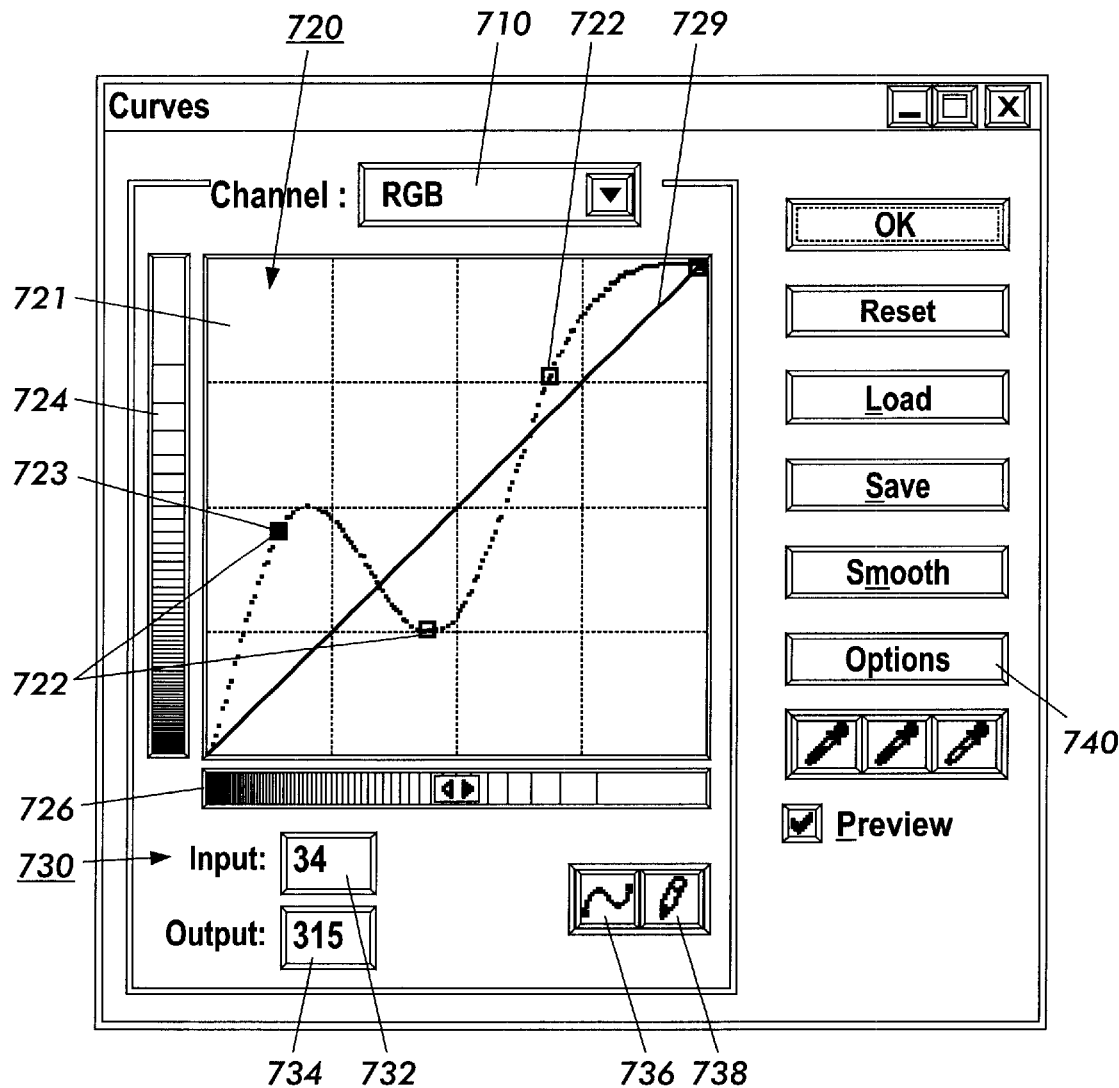
FIG. 6 shows one exemplary embodiment of a conventional tone reproduction curve control graphical user interface.

FIG. 6 shows one exemplary embodiment of a conventional tone reproduction curve control graphical user interface 700. As shown in FIG. 6, the conventional tone reproduction curve control graphical user interface 700 includes a channel selection list box 710, a tone reproduction curve adjusting portion 720 and a control portion 730. In particular, the channel selection list box 710 is used to select the particular tone reproduction curve to be adjusted using the tone reproduction curve adjusting portion 720. That is, each different type of image, such as a binary image, a black/white grayscale image, a red/green/blue (RGB) image, and the like, will have a different tone reproduction curve that converts the image values of the input document or electronic image data into the image values of the output document or electronic image data.

The tone reproduction curve adjusting portion 720 includes a curve portion 720 comprising a graph portion 721 in which the tone reproduction curve is plotted and a plurality of selectable tone reproduction points 722 that can be positioned within the graph 721. An output image value scale 724 and an input image value scale 726 are positioned adjacent to the vertical and horizontal axes of the graph portion 721, respectively. Each of the scale portions 724 and 726 illustrate the range of input and output image values, respectively. A set of control buttons 727 are positioned in the input image value scale 726 and allow the user to adjust the input image value associated with a currently selected one of the tone reproduction curve points 722, such as the currently selected tone reproduction curve point 723.

The control portion 730 includes an input text box 732 and an output text box 734. The control portion 730 also includes a curve fitting button 736 and a tone reproduction curve point insert button 738. The input text box 732 indicates the current input image value of the selected tone reproduction curve point 723, while the output text box 734 indicates the output image value of the selected tone reproduction curve point 723. It should be appreciated that the location of the selected tone reproduction curve point 723 and the graphic portion 721 can be altered in two ways. First, the user can select the selected tone reproduction curve point 723 using a mouse or other input device to drag that selected tone reproduction curve point 723 to a new location within the graph portion 721. As a result, the image values displayed in the input/output text boxes 732 and 734 will change accordingly. In contrast, the user can place the cursor in either of the input or output text boxes 732 or 734 and enter a new image value in either box. As a result, the selected tone reproduction curve point 723 will be redrawn at the updated coordinates displayed in the input and output text boxes 732 and 734.

The tone reproduction curve point insert button 738 is used to add additional tone reproduction curve points 722 to the graph portion 721. Once all of the desired tone reproduction curve points 722 have been entered by the user into the graph portion 721, the user can select the curve fitting button 736 to fit a curve to or through the inserted tone reproduction curve points 722. The particular type of curve fitting performed upon selecting the curve fitting button 736 is selected using the options button 740.

Once the various tone reproduction curve points 722 are positioned by the user at the desired location within the graph portion 721, the tone reproduction curve 728 is fit to the tone reproduction curve points 722. In particular, the tone reproduction curve 728 can be fit to the tone reproduction curve points 722 such that it passes through each of the tone reproduction curve points 722, so that the smoothest possible curve, of the lowest possible dimension, is created. Alternatively, in various exemplary embodiments, a tone reproduction curve having a selected dimension is drawn so that it best fits the tone reproduction curve point 722, but need not pass through each, or any, of the tone reproduction curve point 722, except the extreme points.

Although it is not a part of the graphical user interface 700, a line 729 has been drawn in the graph portion 722. This line 729 illustrates a zero adjustment condition. That is, the line 729 represents a tone reproduction curve where the output image value is equivalent for all values to the corresponding input image value. Those portions of the tone reproduction curve 728 that lie above and to the left of the line 729 represent output image values that are lighter than the corresponding input image values. In contrast, those portions of the toner reproduction curve that lie below and to the right of the line 729 represent output image values that are darker than the corresponding input image values. Where the tone reproduction curve 728 crosses the line 729, the tone reproduction curve points lying at those locations represent output image values that are equivalent to the image input values.

Because the graphical user interface 700 does not include the line 729, (i.e., this line 729 was included in this FIG. 4 explanation purposes only), it is often very difficult, even for sophisticated users, to fully appreciate the effects that the user's adjustments to the tone reproduction curve plotted in the graph portion 721 will have on the output image.

Figure 7:
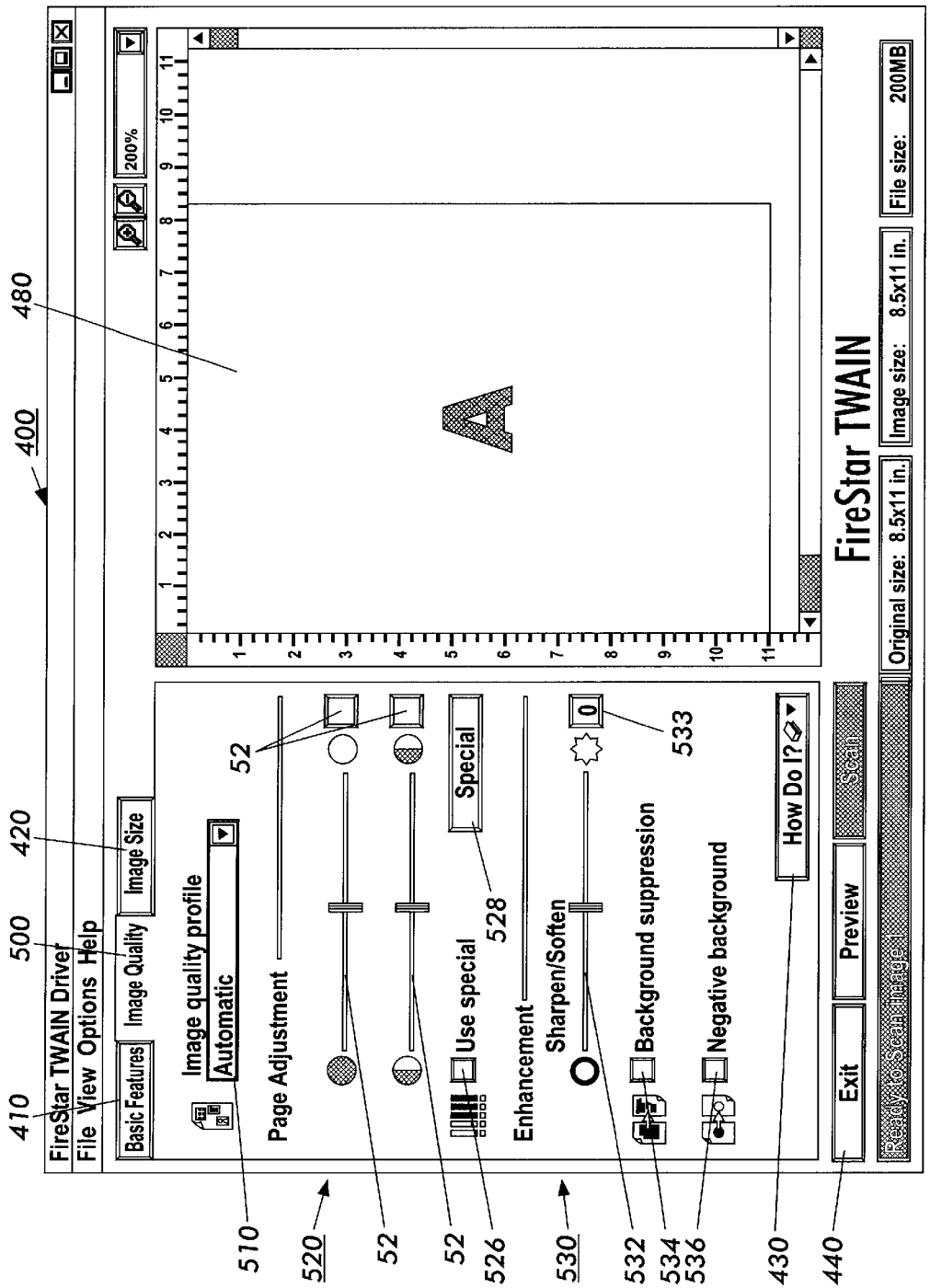
FIG. 7 shows one exemplary embodiment of a graphical user interface usable with the image quality response curve control graphical user interfaces, systems and methods according to this invention.

FIG. 7 shows one exemplary embodiment of a graphical user interface usable with the tone reproduction curve control graphical user interfaces, systems and methods according to this invention. As shown in FIG. 7, the graphical user interface 400 includes the basic features tab 410 and the image size tab 420 in addition to the image quality tab 500. The basic features tab 410 is disclosed in greater detail in the incorporated 274 application. The image size tab 420 is disclosed in greater detail in the incorporated 273 and 274 applications. The "How Do I" button 430 is usable to access an operating instructions help function, which is disclosed in greater detail in the incorporated 266 application. A preview scan can be generated and displayed in the preview pane portion 480 by selecting the preview button 440.

As shown in FIG. 7, the image quality tab 500 includes an image quality profile list box 510, an image adjustments portion 520 and an image enhancements portion 530, in addition to an instance of the "How Do I ?" button 430. The image quality profile list box 510 allows the user to select an image quality profile. As indicated in the incorporated 269 application, each image quality profile is a collection of all the settings on the image quality tab and the various dialogue boxes and other graphical user interface widgets that are accessed through the image quality tab. In particular, the image quality profile list box 510 will include the same image quality profiles as will be provided on the image quality tab. When an image quality profile is selected using the image quality profile list box 510, the image quality profile parameters displayed in the various portions of the image quality tab will be change accordingly.

The image adjustments portion 520 includes a lighten/darken slider 522, a lighten/darken value text box 523, an increase/decrease contrast slider 524 and an increase/decrease contrast value text box 525. The lighten/darken slider 522 is used to change the overall relationship between the lightness or darkness of the captured electronic image relative to the image on the original document. The lighten/darken value text box 523 indicates the numerical value of the lighten/darken slider 522. Similarly, the increase/decrease contrast slider 524 allows the user to adjust the contrast of the captured electronic image relative to the image on the original document. The increase/decrease contrast value text box 525 indicates the value of the increase/decrease contrast slider 524.

Figure 8:
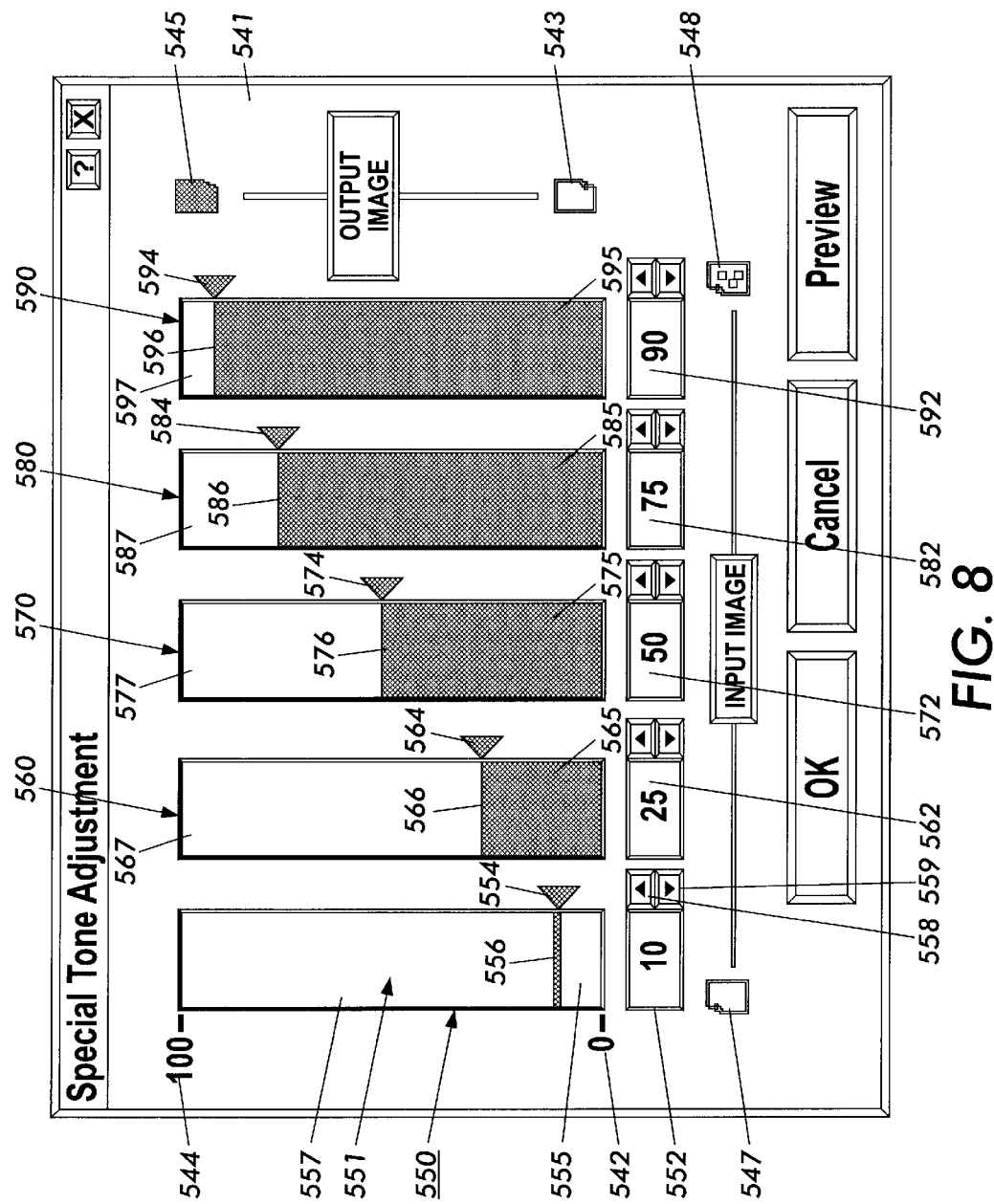
FIG. 8 shows one exemplary embodiment of an image quality curve control graphical user interface according to this invention.

The image adjustments portion 520 also includes a "Use Special" check box 526 and a "Special Adjustments" access button 528. When the Use Special check box 526 is checked, the tone reproduction curve adjustments entered using the special tone adjustments graphical user interface shown in FIG. 8 are used in place of the standard adjustments applied by the lighten/darken slider 522 and the increase/decrease contrast slider 524. The Special Adjustments button 528 is used to access the special tone adjustments graphical user interface 540 shown in FIG. 8 and described in greater detail below. In addition, when the Use Special check box 526 is checked, the lighten/darken slider and value text box 522 and 523 and the increase/decrease contrast slider and value text box 524 and 525 are disabled. Thus, as shown in FIG. 6, the appearance of these elements of the image adjustments portion 520 is changed to a "grayed-out" appearance.

The enhancements portion 530 includes a sharpen/soften slider 532, a sharpen/soften value text box 533, a background suppression check box 534 and a negative image check box 536. The sharpen/soften slider 532 allows the user to adjust the sharpness of the output image relative to that of the image on the original document. The sharpen/soften value text box 533 indicates the value of the sharpen/soften slider 532. It should be appreciated, as indicated above, that other instances of the response curve graphical user interface shown in FIG. 8 can be used to provide fine adjustments to the contrast and to the sharpness of the output image relative to the input image, as well as the lightness/darkness control provided by the tone reproduction curve.

When the background suppression check box 534 is checked, the background suppression function is enabled. Similarly, when the negative image check box 536 is checked, the output image is generated as a negative image relative to the image on the original document. In particular, this inverts the output image values of the captured electronic image relative to the image values of the image on the original document. That is, an image value of the image on the original document of 0 is converted to an image value of the captured electronic image of 255, and vice versa.

FIG. 8 illustrates one exemplary embodiment of a special adjustment graphical user interface 540 that can be accessed by the selecting the Special Adjustments button 528 of the image quality tab 500. As shown in FIG. 8, the special adjustment graphical user interface 540 includes a plurality of slider portions 550, 560, 570, 580 and 590, each of which corresponds to a defined image value, or range of image values, of the input image force particular associated image quality.

Each of the slider portions 550–590 includes a slider 551, 561, 571, 581 and 591, respectively, and a numerical portion 552, 562, 572, 582 and 592, respectively Each of the sliders 551–591 includes a slider pointer 554, 564, 574, 584 and 594, respectively, and an associated slider bar 556, 566, 576, 586 and 596, respectively. Each of the slider bars 556–596 divides the corresponding slider 551–591 into bottom and top portions 555 and 557, 565 and 567, and 575 and 577, 585 and 587 and 595 and 597, respectively. An appearance of each of the bottom portions 555–595 is determined based on the position of the corresponding slider pointer 554–594 and the associated slider bar 556–596 relative to the top and bottom ends of the slider 551–591, the particular image quality that is being adjusted, and the particular range of image quality values and extreme values associated with the top and bottom edges of the sliders 551–591.

The special adjustment graphical user interface 540 includes a lower scale value indicator 542 and an upper scale value indicator 544. In the particular exemplary embodiment of the special adjustment graphical user interface 540 shown in FIG. 8, each of the slider portions 550–590 uses a linear scale having a lower scale value of 0% and an upper scale value of 100%. However, it should be appreciated that any type of scale ruler could be used.

The special adjustment graphical user interface 540 also includes an image quality indicator portion 541, including a first range end indicators 543 and a second range end indicator 545 It should be appreciated that the special adjustment graphical user interface 540 can be used to provide fine-resolution adjustments to any desired image quality, such as the lightness/darkness, the contrast, the shyness, or any other known or later-developed image quality. Thus, it should be appreciated that the special adjustments graphical user interface 540 is not limited to adjusting only the tone reproduction curve. In particular, the special adjustment graphical user interface 540 can have different instances for any of the different image qualities for which fine-resolution adjustments are to be provided.

The special adjustments graphical user interface 540 is particularly useful for providing fine-resolution adjustments of the tone reproduction curve for converting the input image values to the output image values. Thus, in the particular exemplary embodiment of the special adjustments graphical user interface 540 shown in FIG. 8, the image quality being adjusted is the tone reproduction curve that converts the image values of the input image to the image values of the output image. Accordingly, the first range end indicator 543, which indicates one extreme end of the range of output values for the particular image quality being adjusted, in this exemplary embodiment of the special adjustment graphical user interface 540 represents an extremely lightened image. In contrast, the second range end indicator 545, in this exemplary embodiment of the special adjustment graphical user interface 540, represents an extremely darkened image.

Similarly, an input image quality portion 546, which in most cases will indicate the same image quality as indicated in the image quality portion 541, includes a first range end indicator 547 and a second range end indicator 548. In particular, the first and second range end indicators 547 and 548 provide visual cues to the user so that the user can visually identify which value or range of values, of the image quality being adjusted, are associated with each of the slider portions 550–590.

Each of the numerical portions 552, 562, 572, 582 and 592 indicate the numerical value of the corresponding slider pointer 554–594 and slider bar 556–596 within the range indicated by the range indicators 542 and 544. Each of the numerical portions 552–592 includes a pair of increase and decrease value buttons 558 and 559, 568 and 569, 578 and 579, 588 and 589, and 598 and 599, respectively, that allow the user to directly increase or decrease the numerical value of the corresponding numerical portion 552–592. When the user uses the increase buttons 558–598 or the decrease buttons 559–599 to increase or decrease the numerical value in the corresponding numerical portion 552–592, the position of the corresponding slider pointer 554–594 and the corresponding slider bar 556–596 within the corresponding slider 551–591 is adjusted up or down, respectively. At the same time, the visual appearance of the corresponding bottom portion 555–595 is adjusted to reflect the new numerical value of the corresponding numerical portion 552–592.

In this way, the slider portions 550–590 provide an intuitive visual indication to the user of the effect the selected value in each of the slider portions 550 has on the corresponding value or range of values of the associated image quality on the output image relative to the input image. Thus, in the exemplary embodiment of the special adjustment graphical user interface 540 shown in FIG. 8, which is used to adjust the tone reproduction curve, the user can quickly visually determine that the middle input image values represented by the slider portions 560, 570 and 580 essentially remain unchanged in the output image, while the extreme values represented by the slider portions 550 and 590 are moved towards the center, i.e., 50%, value.

As indicated above, each of the slider portions 550–590 can represent a single value of the image quality of the input image, or can represent a range of values of the image quality of the input image. If each of the slider portions 550–590 represents a single value, the response curve for converting the values of the associated image quality for the input image to the values of the associated image quality for the output image can be created as outlined in any of the exemplary embodiments discussed above with respect to the graphical user interface 700. Thus, a curve could be fit to the values selected using the slider portions 550–590. In contrast, a curve could be fit so that it passes between, but does not necessarily include, the values indicated in the slider portions 550–590. Similarly, if each of the slider portions represents a range of values of the selected image quality of the input image, any known or later developed method for generating a conversion curve could be used.

It should be also be appreciated that, rather than indicating the percentage of the output range that is indicated by the slider pointer 554–594 and the slider bar 556–595, the range of the slider portions 550–590 could instead be functions of the represented image values or range of image values. For example, the range of the slider portions 550–590 could extend between 0% and 200% of the represented image value or range of image values, with the center position representing the 100% function. In this way, moving the slider pointers 554–594 and the slider bars 556–596 downward causes the represented image value or range of image values of the input image to be proportionally reduced when creating the output image. In contrast, moving the slider pointers 554–594 and the slider bars 556–596 upwards the represented image value or range of image values of the input image to be correspondingly increased when generating the outputting image. Thus, placing all of the slider pointers 554–594 and the corresponding slider bars 556–596 at the 100%, or middle location causes the output image values to be identical to the input image values.

Figure 9A:
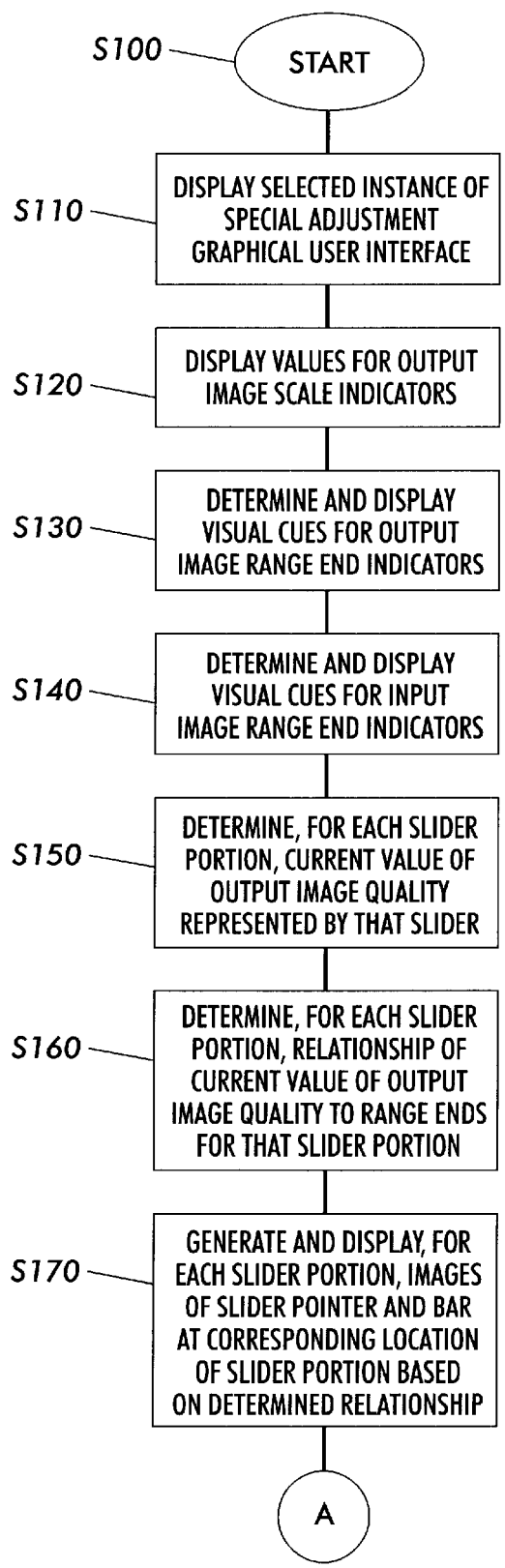
FIGS. 9A–9C are a flowchart outlining one exemplary embodiment of a method for generating, displaying and using the response curve control graphical user interface according to this invention.
Figure 9B:
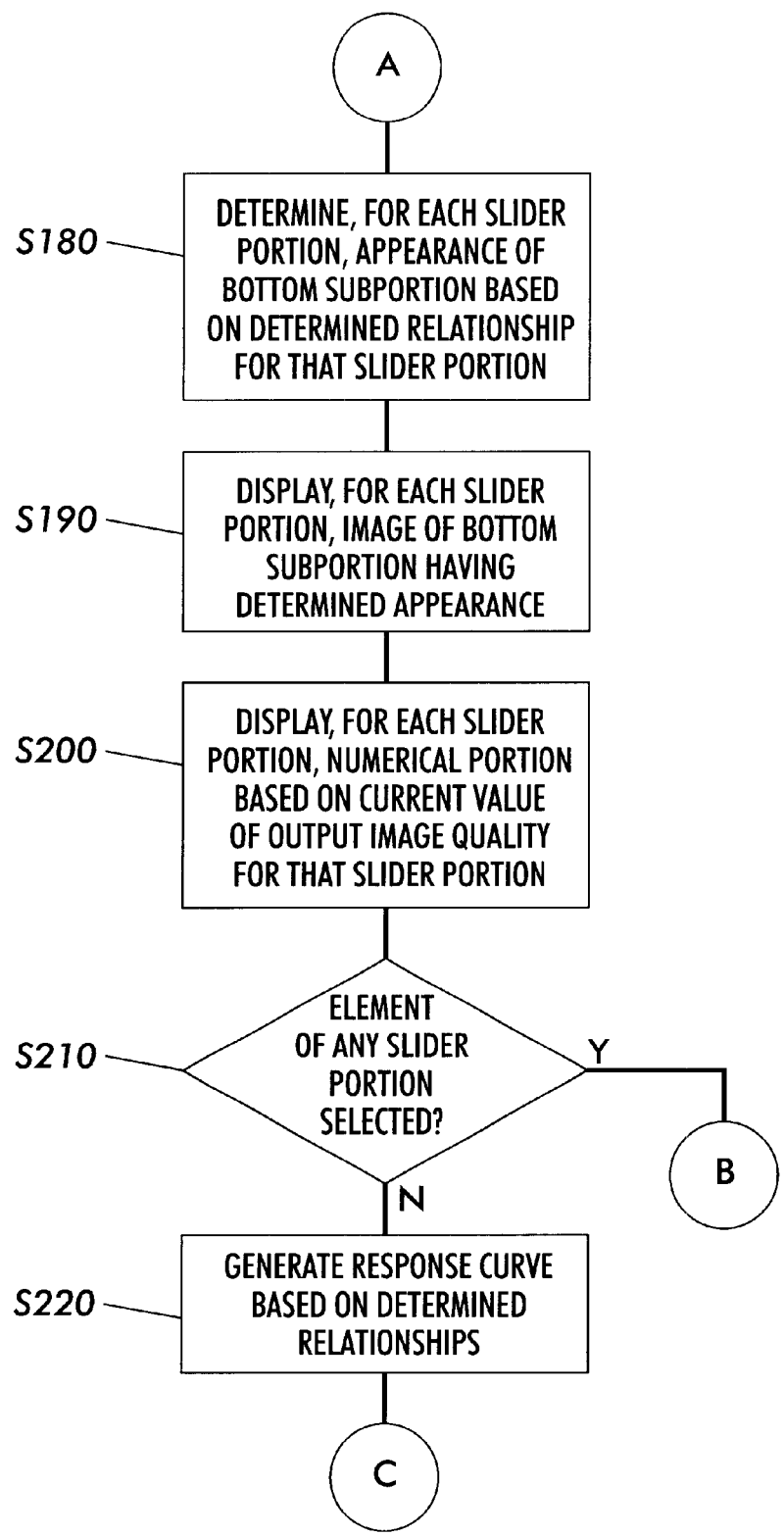
Figure 9C:
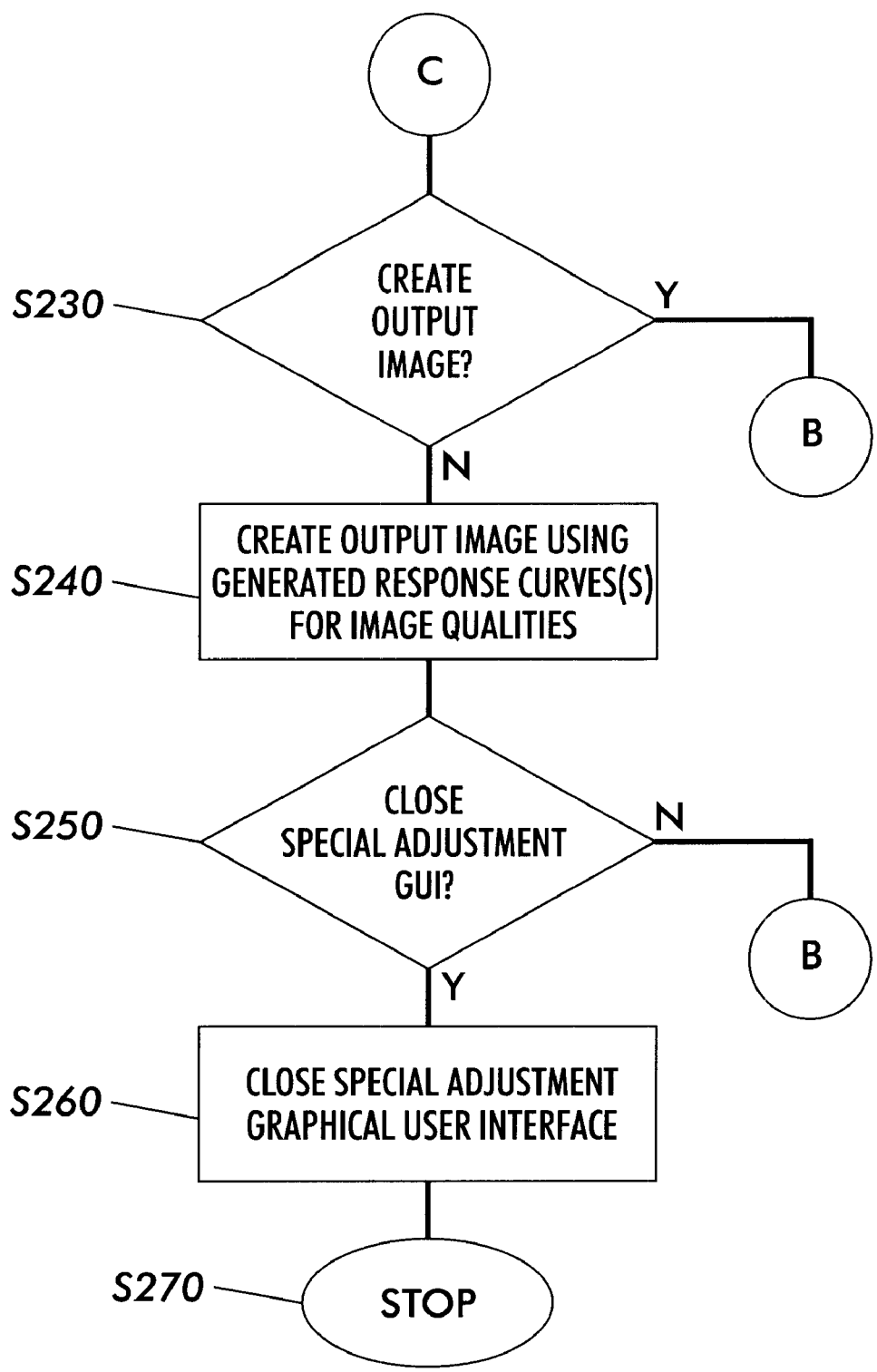

FIGS. 9A–9C are a flowchart outlining one exemplary embodiment or a method for displaying a special adjustment graphical user interface and using the displayed special adjustment graphical user interface to adjust the response curve for a selected image quality. Thus, beginning in step S100, which occurs whenever the special adjustment graphical user interface is accessed, control continues to step S110, where a selected instance of the special adjustment graphical user interface is displayed for the selected image quality. Next, in step S120, the values for the scale indicators 542 and 544 are determined and displayed. Then, in step S130, visual cues for the output image range end indicators are determined and displayed. Next, in step S140, the visual cues for the input image range end indicators 547 and 548 are determined and displayed. Control then continues to step S150.

In step S150, for each of the implemented slider portions, a current value of the response curve for the input image quality value represented by each of the slider portions is determined. Next, in step S160, the relationship of the current value for each slider relative to the ends of the scale is determined. Then, in step S170, for each of the slider portions, images of the slider pointer and the slider bar are generated and displayed at the appropriate relative location within the slider portion based on the determined relationship. Control then continues to step S180.

In step S180, for each of the slider portions, the appearance of the bottom subportion of each slider is determined based on the determined relationship and an appearance map that defines the different appearances the bottom subportions can take. Then, in step S190, images of each of the bottom subportions of the slider portions are generated and displayed based on the corresponding determined appearance. In step S200, for each of the slider portions, an image of the corresponding numerical portions is generated and displayed based on the current value of the response curve. Control then continues to step S210.

In step S210, a determination is made whether the user has selected one of the slider portions, the slider bar, the slider portion, or either of the increase or decrease buttons of the numerical portion corresponding to that slider portion. If so, control jumps back to step S150. Otherwise, control continues to step S220.

In step S220, a response curve is generated based on the current values of each of the slider portions. Next, in step S230, a determination is made whether the user has selected that an output image is to be created. If so, control continues to step S240. Otherwise, control jumps back to step S150. As indicated above, the output image can either be a captured electronic image of a scanned original document, or an image formed on an image recording medium from stored electronic image data.

In step S240, the output image is created using the response curve generated in step S220. Next, in step S250, a determination is made whether the special adjustment graphical user interface window has been closed. If so, control continues to step S260. Otherwise, control jumps back to step S150. Instep S260, the special adjustment graphical user interface is closed. Then, in step S270, the response curve adjusting method ends.

It should be appreciated that the image capture device control systems 200 and 600 shown in FIGS. 2 and 5 can each be implemented on a general purpose computer. However, it should also be appreciated that the image capture device control systems 200 and 600 can also each be implemented on a special purpose computer, a programmed microprocessor or microcontroller and peripheral integrated circuit elements, an ASIC or other integrated circuit, a digital signal processor, a hardwired electronic or logic circuit such as a discreet element circuit, a programmable logic device such as a PLD, PLA, FPGA and/or PAL, or the like. In general, any device, capable of implementing a finite state machine, that is in turn capable of implementing the flowchart shown in FIGS. 9A–9C, can be used to implement either of the image capture device control systems 200 or 600.

The memory 630 shown in FIG. 5 can include both volatile and/or non-volatile alterable memory or non-alterable memory. Any alterable memory can be implemented using any combination of static or dynamic RAM, a hard drive and a hard disk, flash memory, a floppy disk and disk drive, a writable optical disk and disk drive, or the like. Any non-alterable memory can be implemented using any combination of ROM, PROM, EPROM, EEPROM, an optical CD-ROM disk, an optical ROM disk, such as a CD-ROM disk or a DVD-ROM disk and disk drives, or the like.

Thus, it should be understood that each of the elements of the image capture device control systems 200 and 600 shown in FIGS. 2 and 5 can be implemented as portions of a suitably programmed general purpose computer. Alternatively, each of the elements shown in FIGS. 2 or 5 can be implemented as physically distinct hardware circuits within an ASIC, or using a FPGA, a PLD, a PLA, or a PAL, or using discreet logic elements or discreet circuit elements. The particular form each of the elements of the image capture device control systems 200 or 600 shown in FIGS. 2 and 5 will take as a design choice and will be obvious and predictable to those skilled in the art.

Moreover, the image capture device control systems 200 or 600 can each be implemented as software executing on a programmed general purpose computer, a special purpose computer, a microprocessor or the like. In this case, the image capture device control systems 200 and 600 can be implemented as routines embedded in a peripheral driver, as a resource residing on a server, or the like.

The image capture device control systems 200 and 600 can each also be implemented by physically incorporating them into a software and/or hardware system, such as the hardware and software systems of a digital copier or the like.

While this invention has been described in conjunction with the exemplary embodiments outlined above, it is evident that many alternatives and modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An image capture control system for an image capture device, comprising:
   a controller that provides control parameters to the image capture device, the image capture device able to capture an image from an original document based on the provided control parameters, the control parameters including scale parameters usable to scale the captured image;
   a display device; and
   a graphical user interface displayable on the display device, the graphical user interface including a plurality of sliders associated with a control function, each slider allowing a user to control a corresponding portion of the associated control function and comprising:
   a slider portion, a range of values for the corresponding portion of the associated control function associated with a vertical dimension of the slider portion;
   a pair of numerical indicators, a first one of the pair of numerical indicators associated with a minimal value of the range of values and positioned relative to a bottom of the slider portion, a second one of the pair of numerical indicators associated with a maximal value of the range of values and positioned relative to a top of the slider portion;
   a slider bar extending across the slider portion perpendicularly to the vertical dimension of the slider portion, the slider bar positioned along the vertical dimension of the slider portion based on a relationship between a default value for the corresponding portion of the associated control function and the range of values; and
   a selectable slider pointer positioned adjacent to the slider portion, the slider pointer positioned along the vertical dimension of the slider portion based on between a current value for the corresponding portion of the associated control function and the range of values, the slider pointer dividing the slider portion into a top subportion extending between a current position of the slider pointer relative to the slider portion and the top of the slider portion and a bottom subportion extending between a current position of the slider pointer relative to the slider portion and the bottom of the slider portion;
   wherein an appearance of the bottom subportion of the slider portion is determined based on the relationship between the current value for the corresponding portion of the associated control function and the range of values, is uniform within the bottom subportion of the slider portion, and contrasts visually with the top subportion of the slider portion.

2. The image capture control system of claim 1, wherein, for each slider and the corresponding portion of the associated control function, the current value for the corresponding portion of the associated control function can be altered by selecting that selectable slider pointer and altering the current position of that slider pointer relative to that slider portion.

3. The image capture control system of claim 2, wherein the appearance of the bottom subportion of that slider portion changes when the current position of the slider pointer relative to the slider portion is altered.

4. The image capture control system of claim 1, wherein each slider further comprises:
   a numerical value display portion that displays a numerical value corresponding to the current value for the corresponding portion of the associated control function and the range of values;
   an increase value button that increases the current value for the corresponding portion of the associated control function; and
   a decrease value button that decreases the current value for the corresponding portion of the associated control function.

5. The image capture control system of claim 4, wherein, for each slider:
   the current value for the corresponding portion of the associated control function can be altered by selecting the selectable slider pointer and altering the current position of the slider pointer relative to the slider portion; and
   the numerical value displayed in the numerical value display portion changes when the current position of the slider pointer relative to the slider portion is altered.

6. The image capture control system of claim 4, wherein:
the current value for the corresponding portion of the associated control function can be altered and the numerical value displayed in the numerical value display portion can be changed by selecting one of the increase and decrease buttons; and
the current position of the slider pointer relative to the slider portion changes when the numerical value displayed in the numerical value display portion is changed.

7. The image capture control system of claim 1, wherein the pair of numerical indicators indicate actual minimal and maximal values of the range of values for the corresponding portion of the associated control function.

8. The image capture control system of claim 1, wherein the pair of numerical indicators indicate percentage values of the range of values relative to the minimal value of the range of values for the corresponding portion of the associated control function.

9. A graphical user interface displayable on a display device, the graphical user interface including a plurality of sliders associated with a control function, each slider allowing a user to control a corresponding portion of the associated control function and comprising:
a slider portion, a range of values for the corresponding portion of the associated control function associated with a vertical dimension of the slider portion;
a slider bar extending across the slider portion perpendicularly to the vertical dimension of the slider portion, the slider bar positioned along the vertical dimension of the slider portion based on a relationship between a default value for the corresponding portion of the associated control function and the range of values; and
a selectable slider pointer positioned adjacent to the slider portion, the slider pointer positioned along the vertical dimension of the slider portion based on a relationship between a current value for the corresponding portion of the associated control function and the range of values, the slider pointer dividing the slider portion into a top subportion extending between a current position of the slider pointer relative to the slider portion and the top of the slider portion and a bottom subportion extending between a current position of the slider pointer relative to the slider portion and the bottom of the slider portion;
wherein an appearance of the bottom subportion of the slider portion is determined based on the relationship between the current value for the corresponding portion of the associated control function and the range of values, is uniform within the bottom subportion of the slider portion, and contrasts visually with the top subportion of the slider portion.

10. The graphical user interface of claim 9, wherein the current value of the control function can be altered by selecting the selectable slider pointer and altering the current position of the slider pointer relative to the slider portion.

11. The graphical user interface of claim 10, wherein the appearance of the bottom subportion of the slider portion changes when the current position of the slider pointer relative to the slider portion is altered.

12. The graphical user interface of claim 9, further comprising:
a numerical value display portion that displays a numerical value corresponding to the current value for the corresponding portion of the associated control function and the range of values;
an increase value button that increases the current value for the corresponding portion of the associated control function; and
a decrease value button that decreases the current value for the corresponding portion of the associated control function.

13. The graphical user interface of claim 12, wherein:
the current value of the control function can be altered by selecting the selectable slider pointer and altering the current position of the slider pointer relative to the slider portion; and
the numerical value displayed in the numerical value display portion changes when the current position of the slider pointer relative to the slider portion is altered.

14. The graphical user interface of claim 12, wherein:
the current value of the control function can be altered and the numerical value displayed in the numerical value display portion can be changed by selecting one of the increase and decrease buttons; and
the current position of the slider pointer relative to the slider portion changes when the numerical value displayed in the numerical value display portion is changed.

15. The graphical user interface of claim 9, further comprising:
a pair of numerical indicators, a first one of the pair of numerical indicators associated with a minimal value of the range of values and positioned relative to a bottom of the slider portion, a second one of the pair of numerical indicators associated with a maximal value of the range of values and positioned relative to a top of the slider portion.

16. The graphical user interface of claim 15, wherein the pair of numerical indicators indicate actual minimal and maximal values of the range of values.

17. The graphical user interface of claim 15, wherein the pair of numerical indicators indicate percentage values of the range of values relative to the minimal value of the range of values.

18. A method for displaying graphical user interface including a plurality of sliders associated with a control function, each slider allowing a user to control a corresponding portion of the associated control function having a range of values, the method comprising, for each slider:
determining the range of values for the corresponding portion of the associated control function;
determining a current value and a default value for the corresponding portion of the associated control function;
determine relationships between the current value and of the default value to the determined range of values;
displaying a slider portion of that slider;
displaying a slider bar of that slider at a position relative to the slider portion based on the determined relationship between the default value and the determined range of values;
displaying a slider pointer of that slider at a position relative to the slider portion based on the determined relationship between the current value and the determined range of values;
determining an appearance value of that slider based on the determined relationship between the current value and the determined range of values; and
altering an appearance of a subportion of the slider portion of that slider based on the determined appearance value.

19. The method of claim 18, further comprising, for each of at least one of the sliders, altering the current value for the corresponding portion of the associated control function of that slider, comprising;

selecting the slider pointer of that slider; and altering the position of the slider pointer of that slider relative to the slider portion of that slider.

20. The method of claim 19, further comprising, for that slider, altering the determined appearance value as the position of the slider pointer relative to the slider portion is altered.

21. The method of claim 18, further comprising, for each slider, displaying a numerical value display portion that includes a numerical value corresponding to the current value for the corresponding portion of the associated control function and the range of values for that slider, an increase value button usable to increase the current value of the associated control function, and a decrease value button usable to decrease the current value of the associated control function.

22. The method of claim 21, further comprising, for each of at least one of the sliders:

altering the current value for the corresponding portion of the associated control function for that slider, comprising:

selecting the selectable slider pointer of that slider, and altering the current position of the slider pointer of that slider relative to the slider portion of that slider; and altering the numerical value displayed in the numerical value display portion of that slider when the current position of the slider pointer relative to the slider portion is altered.

23. The method of claim 21, further comprising, for each of at least one of the sliders:

altering the current value for the corresponding portion of the associated control function for that slider and the numerical value displayed in the numerical value display portion of that slider by selecting one of the increase and decrease buttons of that slider; and altering the position of the slider pointer of that slider relative to the slider portion of that slider when the numerical value displayed in the numerical value display portion of that slider is altered.

24. The method of claim 18, further comprising, for each of at least one of the sliders, displaying a pair of numerical indicators, a first one of the pair of numerical indicators for that slider associated with a minimal value of the range of values and positioned relative to a bottom of the slider portion, a second one of the pair of numerical indicators for that slider associated with a maximal value of the range of values and positioned relative to a top of the slider portion.

* * * * *